(12) United States Patent
Pontius et al.

(10) Patent No.: US 7,187,741 B2
(45) Date of Patent: Mar. 6, 2007

(54) CLOCK DOMAIN CROSSING FIFO

(75) Inventors: Timothy Pontius, Lake in the Hills, IL (US); Robert L. Payne, San Jose, CA (US); David R. Evoy, Tempe, AZ (US)

(73) Assignee: NXP B.V., Eindhoven (NL)

( * ) Notice: Subject to any disclaimer, the term of this patent is extended or adjusted under 35 U.S.C. 154(b) by 856 days.

(21) Appl. No.: 09/999,007

(22) Filed: Oct. 31, 2001

(65) Prior Publication Data

US 2003/0081713 A1 May 1, 2003

(51) Int. Cl.
*H04L 7/00* (2006.01)
*H04L 25/00* (2006.01)
*H04L 25/40* (2006.01)

(52) U.S. Cl. .......................... 375/372; 711/100; 710/4; 710/52

(58) Field of Classification Search ........ 375/370–372, 375/240.28, 275, 256, 293, 354, 356; 327/144–145; 713/400, 500, 501, 503, 375, 600–601; 710/25–29, 710/113, 4; 370/516; 711/100
See application file for complete search history.

(56) References Cited

U.S. PATENT DOCUMENTS 5,452,434 A * 9/1995 MacDonald ................ 713/601
6,209,053 B1 * 3/2001 Kurts ........................ 710/113
6,370,600 B1 * 4/2002 Hughes et al. ................ 710/29

* cited by examiner

*Primary Examiner*—Jean B. Corrielus
(74) *Attorney, Agent, or Firm*—Kevin H. Fortin

(57) ABSTRACT

A method and arrangement of passing data from a source clock domain to a non-synchronous receive clock domain are provided. A first processing circuit, located in the source clock domain, links write-address information with the data, and a clock generator generates a transmit clock signal in the source clock domain synchronous with a source clock. The first processing circuit transmits the clock signal and the data with the linked write-address information to a second processing circuit in the receive clock domain. In the receive clock domain, the second processing circuit writes the data at an address designating a storage element corresponding to the linked write-address information. The second processing circuit clocks the data into the storage element synchronous with the accompanying transmit clock signal responsive to a write enable signal from the source clock domain, and reads the data out of the storage element synchronous with a receive domain clock.

7 Claims, 3 Drawing Sheets

CLOCK DOMAIN CROSSING FIFO

FIELD OF THE INVENTION

The present device relates generally to data communications and, more particularly, to methods and arrangements for transferring data between clock domain boundaries.

BACKGROUND OF THE INVENTION

Ongoing demands for more-complex circuits have led to significant achievements that have been realized through the fabrication of very large-scale integration of circuits on small areas of silicon wafer. These complex circuits are often designed as functionally-defined blocks that operate on a sequence of data and then pass that data on for further processing.

This communication from such functionally-defined blocks can be passed in small or large amounts of data between individual integrated circuits (or "chips"), within the same chip and between more remotely-located communication circuit arrangements and systems. Regardless of the configuration, the communication typically requires closely-controlled interfaces to insure that data integrity is maintained and that chip-set designs are sensitive to practicable limitations in terms of implementation space and available operating power.

With the increased complexity of circuits, there has been a commensurate demand for increasing the speed at which data is passed between the circuit blocks. Many of these high-speed communication applications can be implemented using parallel data interconnect transmission in which multiple data bits are simultaneously sent across parallel communication paths. Such "parallel bussing" is a well-accepted approach for achieving data transfers at high data rates.

A typical system might include a number of modules (i.e., one or more cooperatively-functioning chips) that interface to and communicate over a parallel data bus, for example, in the form of a cable, other interconnect and/or via an internal bus on a chip. A transmitting module transmits data over the bus synchronously with a clock on the transmitting module. In this manner, the transitions on the parallel signal lines leave the transmitting module in a synchronous relationship to each other and/or to a clock on the transmitting module. At the other end of the parallel data interconnect, the receiving module receives the data on a parallel data bus. In such systems, the received signals (and where applicable, the receive clock) should have a specific phase relationship in order to provide proper data recovery.

Many integrated circuits (ICs) today include more than one clock domain; therefore a data-transmitting module might be operating in one clock domain at a first clock frequency, while a data-receiving module is operating in another clock domain at a different (and perhaps non-synchronous) second clock frequency. The interface between clock domains is a clock domain boundary, or a clock domain crossing where information crosses the boundary. Clock signal path distance is typically limited to confine clock signal "skew" effects within tolerable limits; therefore, a clock domain generally correlates with a compact geographical region of an IC.

Where transmitting and receiving modules reside in different clock domains, the instantaneous rate at which data are transmitted in one clock domain may not match the instantaneous rate at which data are used (i.e., consumed) in another domain. To accommodate data rate differences, a discrete buffering device is conventionally used between the clock domains. Data is clocked into the buffering device according to a source domain (i.e., write) clock, and clocked out of the buffering device according to a receive domain (i.e., read) clock.

Conventional buffering devices require that data, address and write-enable inputs meet certain setup and hold timing requirements with respect to a write clock, requiring the storage element be located near the write clock domain to maintain required timing relationships. At the same time, output (read) data from the conventional buffering device typically becomes valid with some non-zero delay after a read address changes. If a read clock frequency is not extremely low, a read address counter should be located near the multiplexing function inside the buffering device; therefore, the buffering device must simultaneously be located near the read clock domain to ensure data integrity. Typically, the buffering device is physically located very near the clock domain boundary so that neither clock domain is over-extended. Locating the buffering device within one of the clock domains requires extending a clock signal from the other clock domain into the "foreign" clock domain to reach the buffering device. This practice increases skew concerns for the over-extended clock signal.

Skew is a time delay or offset between any two signals. There is often an anticipated amount of time skew between transmitted data signals themselves and between address/data signals and a clock signal at the destination. A skew can be caused by a number of phenomena including, for example, transmission delays introduced by the capacitive and inductive loading of the signal lines of the parallel interconnect, variations in the input/output driver source, intersymbol interference and variations in the transmission lines' impedance and length. Regardless of which phenomena cause the skew, the phenomena present a serious integrity issue for the data being communicated and, in many applications, the overall communication system.

Implementing integrated circuits using a plurality of clock domains is desirable for a variety of reasons. Accordingly, improving data communication over parallel busses between clock domains permit more practicable and higher-speed parallel bussing applications which, in turn, can directly lead to serving the demands for high-speed circuits while maintaining data integrity in the presence of skew-causing phenomena. Various aspects of the present invention address the above-mentioned deficiencies and also provide for communication methods and arrangements that are useful for other applications as well.

SUMMARY OF THE INVENTION

The present invention is directed to a method and circuit for passing data from a source clock domain to a receive clock domain operating at a different frequency than the source clock domain. The present invention is exemplified in a number of implementations and applications, some of which are summarized below.

According to an example embodiment of the present invention, a method for passing data from a source clock domain to a non-synchronous receive clock domain is provided. In the source clock domain, write-address information is linked with the data. A clock generator generates a transmit clock signal synchronous to a source clock domain clock. Data and the linked write-address information, along with the transmit clock signal, are transmitted to the receive clock domain. In the receive clock domain, the data is written to an address designating a storage element corresponding to the linked write-address information. The data is clocked into the storage element synchronous with the accompanying transmit clock signal; however, the data is read out of the storage element synchronous with a receive clock domain clock.

According to one aspect of the present invention, the receive clock domain clock operates at a slower frequency than the source clock domain clock. According to another aspect of the present invention, a data control signal is communicated from the source clock domain to the data storage element, and the data is received into the storage element responsive to a data control signal.

According to another example embodiment of the present invention, a circuit arrangement for passing data from a source clock domain to a non-synchronous receive clock domain is provided. A clock generator generates a transmit clock signal in the source clock domain synchronous with a source clock. A first processing circuit, located in the source clock domain, is adapted to link write-address information with the data. The first processing circuit is further adapted to transmit the data with the linked write-address information, and the transmit clock signal, to the receive clock domain. A second processing circuit, located in the receive clock domain, is adapted to write the data at an address designating a storage element, also located in the receive clock domain, corresponding to the linked write-address information. The second processing circuit is further adapted to clock the data into the storage element synchronous with the accompanying transmit clock signal, and read the data out from the storage element synchronous with a receive domain clock.

According to another aspect of the present invention, the first processing circuit is further adapted to transmit a data control signal from the source clock domain to the storage element in the receive clock domain, the storage element being adapted to receive the data responsive to a data control signal.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
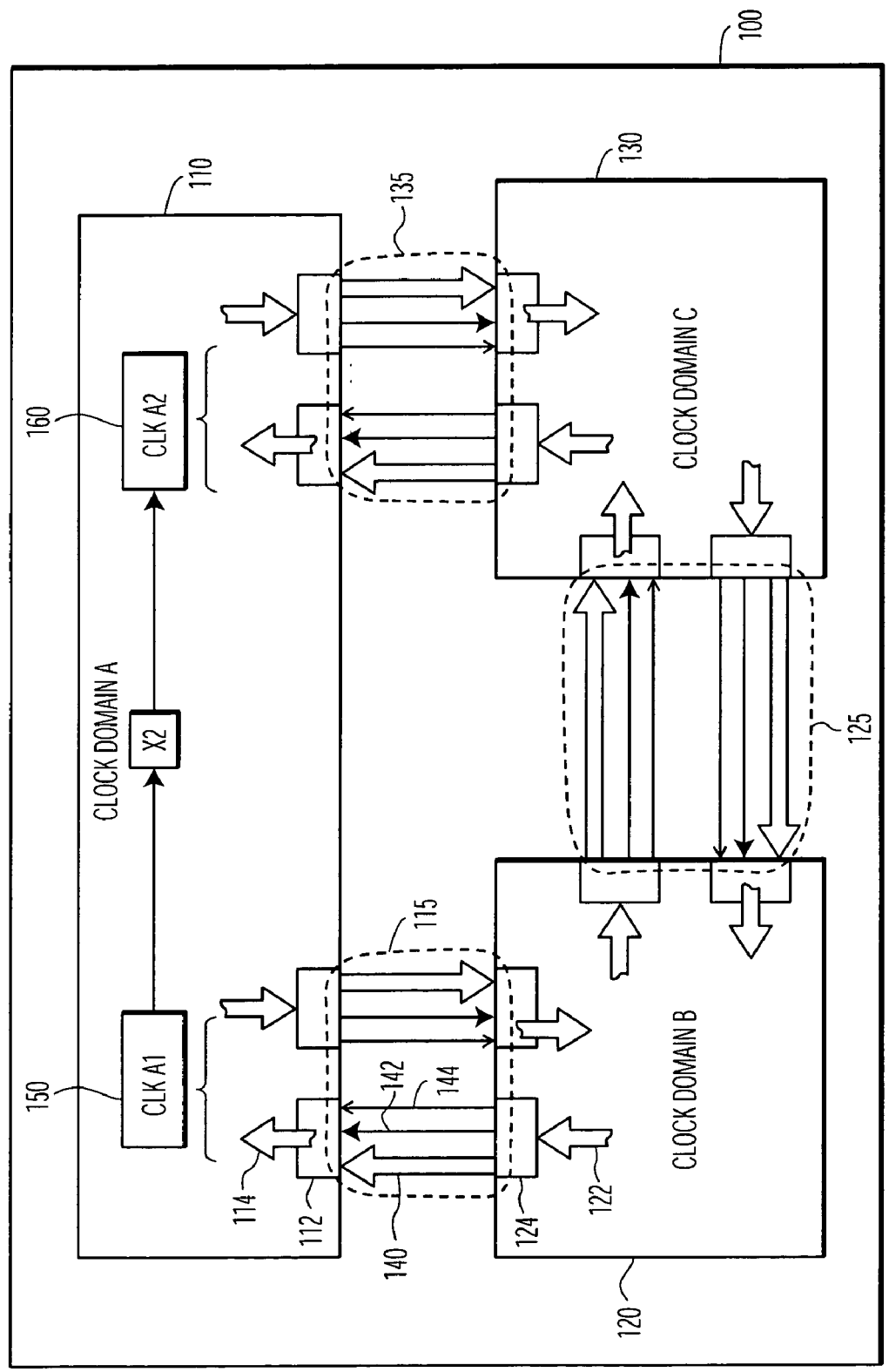
FIG. 1 is a block diagram illustrating an integrated circuit having a plurality of clock domains, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of electronic circuits, and has been found to be particularly suited for use in connection with integrated circuits implemented with a plurality of clock domains and parallel data communications therebetween. While the present invention is not necessarily limited to such devices, an appreciation of various aspects of the invention is best gained through a discussion of various examples using this application.

According to a general example embodiment of the present invention, data originating from circuits within a source clock domain is transmitted through a data buffering arrangement to circuits within a receive clock domain. The data is written into the buffering arrangement synchronous with a source clock (a write clock) of the source clock domain, and read from the buffering function synchronous with a receive clock (a read clock) of the receive clock domain. The buffering arrangement need not be physically located at the clock domain boundary. Effectively, the data buffering arrangement of the present invention is split into two portions, all circuitry that must be synchronous to a write clock ("the write side") being located in a write (i.e., source) clock domain, and all circuitry that must be synchronous to a read clock ("the read side") being located in a read (i.e., receive) clock domain. A memory element of the buffering arrangement is substantially contained in the receive clock domain. The write clock is not directly connected to the memory element, thus need not be overextended into the receive clock domain.

The write side of the buffering arrangement accepts the data to be written, for example in a pipeline register, and maintains a write-address counter. Write-address information is linked to the data and transmitted to the memory element using a source-synchronous approach whereby a clocking signal is transmitted with the data (and linked write-address information). Using a source-synchronous transmit clock signal rather than extending the source clock over long data transmission distances, eliminates skew issues between the clocking signal used to write data into the storage portion of the buffering function and the clocking signal throughout the balance of the source clock domain. Skew between the memory element write and read clocks is not problematic in the present invention since the write operation from the source clock domain and the read operation to the receive clock domain are intentionally non-synchronous. Only clock signal skew between the transmit clock signal and the accompanying data/address information remains, and is controllable by ensuring the time required for the data/address information to traverse the physical distance from the source clock domain to the memory element in the receive clock domain is approximately equal to the time require for the source-synchronous clock to traverse the (same) physical distance.

In another example embodiment of the present invention, an integrated circuit is implemented having a plurality of clock domains, and parallel data communications therebetween. The integrated circuit includes a buffering arrangement interfacing the data communications between the respective clock domains. The two-clock, dissected buffering arrangement includes a first processing circuit located in a source clock domain, and a second processing circuit located in a receive clock domain. The source and receive clock domains respectively use source and receive clocks which are not synchronous between domains. According to one aspect of the present invention, the receive clock operates at a slower frequency than the source clock so that data tends to periodically accumulate in the buffering arrangement. A clock-generating circuit generates a transmit clock signal, the transmit clock signal being synchronous with the source clock.

The first processing circuit links data originating in circuits of the source clock domain with write-address information from a write pointer device, also located in the source clock domain, and then transmits the data with the linked write-address information to the second processing circuit. The transmit clock signal is also transmitted from the source clock domain to the receive clock domain, accompanying the data and linked write address information.

According to one aspect of the present invention, a data control signal (e.g., a write enable signal) is additionally sent from the source clock domain to the receive clock domain. The second processing circuit writes the data at an address designating a storage element responsive to the data control signal, the designated address corresponding to the linked write-address information. The data is clocked into the storage element by the second processing circuit synchronous with the accompanying transmit clock signal, and subsequently read out from the storage element synchronous with the receive clock.

According to one aspect of the present invention, source-synchronous write commands are transmitted across a clock domain boundary, potentially a relatively long physical distance (e.g., at least an order of magnitude longer than distances traversed by signals internal to one of the clock domains). The number of electrical signal paths crossing the clock domain boundary is approximately equal to the number of data bits (i.e., the width of the FIFO) plus twice the number of address bits, plus two for the clock and data control signals, and, for each of the respective counters, a bit to differentiate between full and empty. The quantity of electrical signal paths required is dependent on the depth of the storage element of the buffering function. If the depth of the storage element is a power of two, a "circular" Gray code address scheme can be employed with the accompanying efficiencies. A Gray coded write counter and read counter are used to track the current addresses for each function within the storage element. The maximum quantity of electrical signal paths needed to cross the boundary can be expressed as $N+2*\lceil \log_2(M) \rceil +4$ electrical signal paths, N being the number of data bits (i.e., width of the storage element), M being the number of locations within the storage element (i.e., the depth of the storage element), where M is a power of 2 and a Gray code addressing scheme is used, and the four additional bits respectively for the clock signal, data control signal, full/empty write-counter differentiator, and full/empty read-counter differentiator. For example, if the buffer is 32 bits wide and 32 locations deep, the quantity of electrical signal paths crossing the clock domain boundary is $32+2*\lceil \log_2(32) \rceil +4=32+2*5+4=46$, where "$\lceil \ \rceil$" denotes the rounded-up value for the capability of addressing all the bits.

If the depth of the storage element is not a power of two (thus, a Gray code address sequence will have address "gaps"), then Gray code values for the read and write pointers are not well-suited to be used as storage element addresses and a Gray code pointers must be sent in addition to and separately from write-address information. Gray code pointer information increases the number of electrical signal paths by an amount necessary to accommodate one more set of address bits. In the case where the storage element depth is not a power of two, the maximum quantity of electrical signal paths needed to cross the boundary can be expressed as $N+3*\lceil \log_2(M) \rceil +4$ electrical signal paths, N being the number of data bits, M being the depth of the storage element, where M is not a power of 2, and the other four bits for the signaling discussed above. FIG. 1 illustrates an integrated circuit chip 100 of the present invention having a plurality of clock domains, clock domain A 110, clock domain B 120, and clock domain C 130 respectively. Clock domain boundary AB 115 is located between clock domains A and B, clock domain boundary BC 125 is located between clock domains B and C, and clock domain boundary AC 135 is located between clock domains A and C. Two-way parallel data communications traverse each of the clock domain boundaries, as illustrated by each group of data flow arrows. For example arrow 140 indicates parallel data and address information, arrow 142 indicates a clock signal, and arrow 144 indicates a data control signal.

Each clock domain might utilize a single clock frequency throughout the clock domain, or alternatively, include a plurality of synchronous clock signals. For example, clock domain A includes two clock frequencies, clock A1 150 and clock A2 160. Each clock domain is clocked independently from the other clock domains, and clock signals for each clock domain may not be synchronous with clock signals of the other clock domains. Additionally, each clock domain can include clock signals with unique frequencies not found in the other clock domains. Data communications across clock domain boundary AB are directed within clock domain A to circuits operating according to clock A1. Data communications across clock domain boundary AC are directed within clock domain A to circuits operating according to clock A2.

The clock domain from which data flows across a clock domain boundary is referred to as a source clock domain, and the clock domain to which the data flows across the clock domain boundary is referred to as a receiving clock domain. For example in FIG. 1, data originates in clock domain B (i.e., the source clock domain) as indicated by arrow 122 and is received by a first processing circuit 124 in the source clock domain. The data flows across clock domain boundary AB 115, as illustrated by arrow 140, to a second processing circuit 112, and subsequently out of second processing circuit 112 to circuits located in clock domain A as indicated by arrow 114. Depending on the implementation, data may flow in one or both directions across clock domain boundary AB, and optionally across other clock domain boundaries, as further indicated in FIG. 1.

Figure 2:
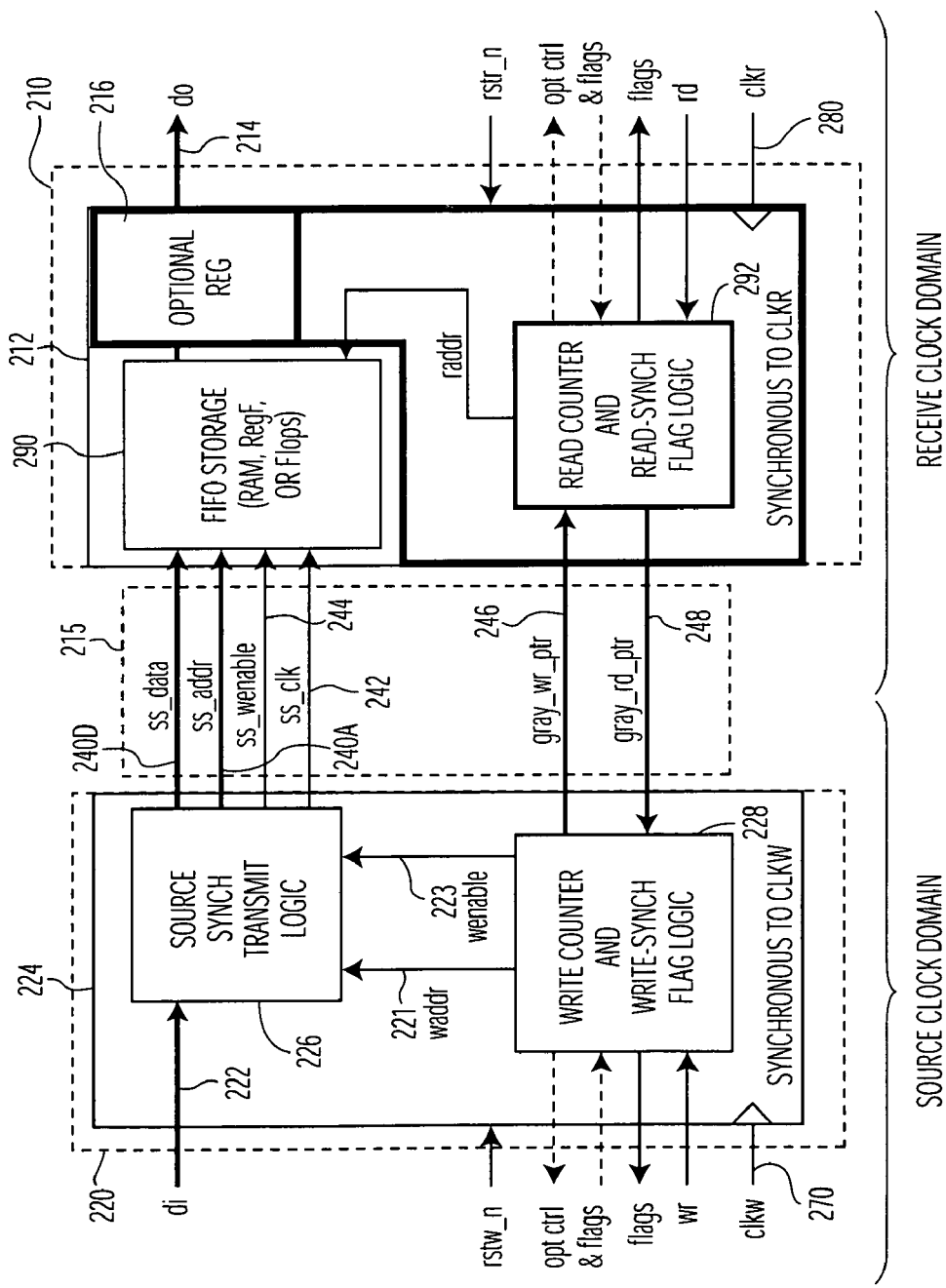
FIG. 2 is a block diagram for a two-clock dissected FIFO, according to an example embodiment of the present invention.

FIG. 2 is a block diagram of one example embodiment of the present invention 200, and illustrates a first processing circuit 224 located in a source clock domain 220. A second processing circuit 212 is located in a receive clock domain 210. Clock domain boundary 215 is located between the source and receive clock domains. Source clock domain provides a source clock signal (or write clock, "clkw") to source clock terminal 270, and first processing circuit operates synchronous to the source clock. Receive clock domain provides a receive clock signal (or read clock, "clkr") to receive clock terminal 280, and second processing circuit operates synchronous to the receive clock.

First processing circuit includes a source-synchronous transmit logic portion 226, and a write counter and write-synchronous flag logic portion 228. Transmit logic 226 receives data to be communicated to the receive clock domain via a data input signal path 222, receives write-address information via a write address ("waddr") signal path 221, and a data control (e.g., write enable) signal via a write enable ("wenable") signal path 223. First processing circuit is adapted to link the data with associated write-address information and transmit, through a parallel communication channel, the data with linked write-address information to the second processing circuit. The data is transmitted via a data signal path ("ss_data") 240D, and the linked write-address information is transmitted via an address signal path ("ss_addr") 240A if the depth of the storage element is not a power of two. First processing unit receives the source clock and other information signals from circuits within source clock domain, and generates flags and other control signals to circuits in the source clock domain as illustrated in FIG. 2.

First processing circuit is adapted to generate a source-synchronous transmit clock signal synchronous to the source clock. The source-synchronous transmit clock signal is communicated to the second processing circuit via a clock signal path ("ss_clk") 242. Transmit logic 226 is further adapted to transmit the data control signal to the second processing circuit via a data control signal path ("ss_wenable") 244.

Second processing circuit includes a storage element 290, and a read counter and read-synchronous flag logic portion 292. According to one aspect of the present invention, the storage element is a FIFO memory arrangement, the FIFO being implemented via a compiled memory. FIFO 290 is alternatively implemented via a register file built from latches, implemented through a configuration of flip-flops, or implemented as another data storage structure. A Gray code write pointer signal is communicated via a Gray code write pointer signal path ("Gray_Wr_Ptr"), and a Gray code read pointer signal is communicated via a Gray code read pointer signal path ("Gray_Rd_Ptr") between first and second processing circuits as necessary.

Second processing circuit receives the data with linked write-address information, the data control signal, and the transmit clock signal through the above-described signal paths. Second processing unit receives the receive clock and other signals from circuits within receive clock domain as illustrated in FIG. 2. The data is written into storage element 290 at an address corresponding with the linked write-address information, the data being clocked-in to the storage element synchronous with the accompanying transmit clock signal. Write operations are responsive to the accompanying data control (e.g., write enable) signal as is conventionally known.

Read counter and read-synchronous flag logic portion 292 receives a read signal ("rd"), optional control and flag information, generates appropriate flag signals and maintains a read address ("raddr") signal designating a storage element from which data is read out of storage portion 290. Data is clocked out of storage element 290 synchronous with the receive clock to a data out ("do") signal path 214, passing through an optional register 216.

Figure 3A:
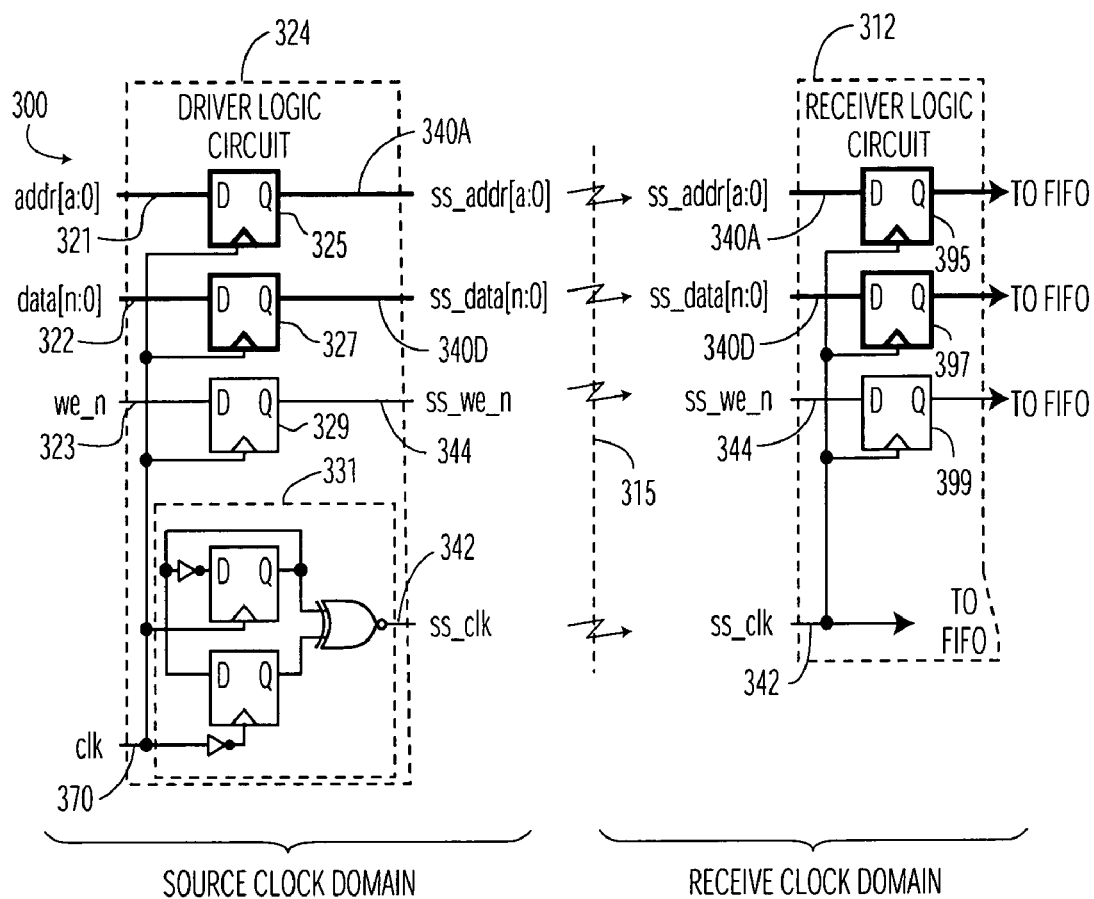
FIG. 3A is a schematic diagram for a source synchronous driver and receiver logic circuit, according to an example embodiment of the present invention.

FIG. 3A is a circuit diagram of one example embodiment of the present invention 300. A driver logic circuit portion 324 of a first processing circuit is located in a source clock domain and "captures" data, address and control information in respective pipeline registers. Driver logic circuit 324 receives a source clock signal (the source clock or "clk") via source clock signal path 370. Each of the flip-flops of driver circuit 324 are clocked by the source clock as shown. Data is received by the driver circuit via a data signal path 322, and clocked through data flip-flop 327 onto source-synchronous data signal path ("ss_data") 340D. Write address information is received by the driver circuit via a write address signal path 321, and clocked through address flip-flop 325 onto a source-synchronous address signal path ("ss_addr") 340A. A data control (e.g., write enable) signal ("we_n") is received by the driver circuit via a data control signal path 323, and clocked through data control flip-flop 329 on to source-synchronous data control signal path ("ss_we_n") 344. A transmit clock-generation circuit 331 generates a transmit clock signal synchronous to the source clock onto source-synchronous transmit clock signal path ("ss_clk") 342. The transmit clock is essentially an inverted source clock, but typically is NOT generated by an inverter, but instead using a technique similar to that shown for transmit clock generation circuit 331, which also introduces some non-trivial phase delay in the transmit clock with respect to the source clock signal.

Figure 3B:
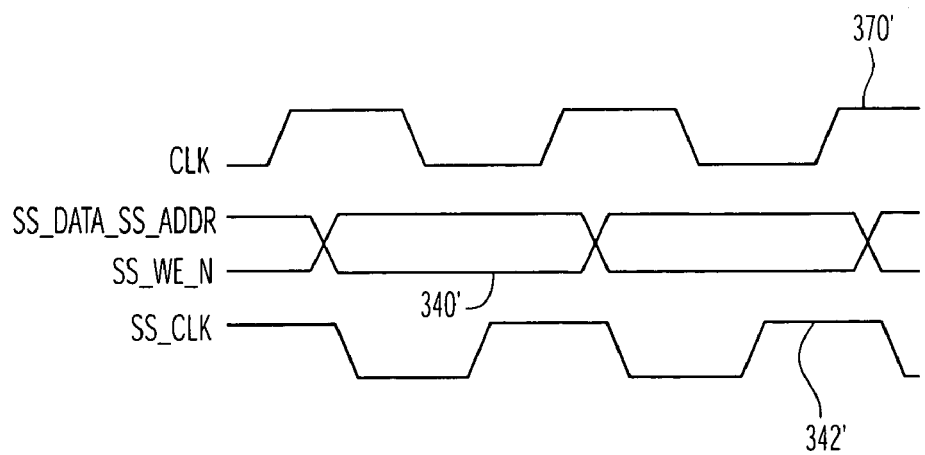
FIG. 3B is a timing diagram for the driver logic circuit, according to an example embodiment of the present invention.

The data, address and data control signals are sampled using the write clock and transmitted over the source-synchronous interface. FIG. 3B is a timing diagram illustrating one example embodiment of representative signals generated by driver logic circuit 324 of FIG. 3A as described above. Signal 370' is representative of a source clock signal on source clock signal path 370. Signal 342' is representative of a transmit source clock signal on source-synchronous transmit clock signal path ("ss_clk") 342. Signal 340' is representative of the signals corresponding to data control signal path ("ss_we_n") 344 and also to the data and address signals on source-synchronous data and address signal paths ("ss_data") 340D and ("ss_addr") 340A, respectively.

Referring once again to FIG. 3A, a receiver logic circuit portion 312 of a second processing unit receives the transmitted data, address, data control and transmit clock signals respectively after they transition the clock domain boundary 315. Each of the flip-flops of receiver circuit 312 are clocked by the source-synchronous transmit clock as shown. The transmit clock also clocks the FIFO storage element of second processing circuit (not shown). Data is received by the receiver circuit via source-synchronous data signal path ("ss_data") 340D and clocked through received data flip-flop 395 to the FIFO storage element. Write address information is received by the receiver circuit via source-synchronous address signal path ("ss_addr") 340A, and clocked through receive address flip-flop 397 to the FIFO. The data control (e.g., write enable) signal is received by the receiver circuit via source-synchronous data control signal path ("ss_we_n") 344 and clocked through received data control flip-flop 399 to the FIFO. The balance of the FIFO storage element, and control thereof, can follow well-known design practices for such data storage devices. Another example implementation of the present invention is directed to a significant reduction of power during periods when data is not being written across the clock domain boundary. When data is not being written across the clock domain boundary, the transmit clock signal 342 of FIG. 3A does not need to be generated, and the inactive FIFO data storage circuitry does not need to be toggled/driven by the transmit clock signal. This clock-disable feature can be implemented, for example, by replacing the inverter at the D-input of the upper flip-flop of the transmit clock-generation circuit 331 with an Exclusive NOR (XNOR) gate having a second input connected to the data control signal path 323. In this manner, the transmit clock signal 342 is automatically stopped unless a write to the FIFO occurs. An added advantage is a reduction in power associated with the potentially long bus lines that interconnect the clock domains; because these bus lines can manifest a relatively high capacitance, disabling the transmit clock signal reduces the drive current normally present.

While the present invention has been described with reference to several particular example embodiments, those skilled in the art will recognize that many changes may be made thereto. For example, the method of the present invention is applicable to remote information buffering arrangements having a buffer output rate different than a buffer input rate, where skew is a concern in extending a write clocking signal to the buffer. These and other modifications and/or additions may be made without departing from the spirit and scope of the present invention, which is set forth in the following claims.

What is claimed is:

1. A method of passing data from a source clock domain to a receive clock domain, the source and receive clock domains respectively using non-synchronous source and receive clocks, the method comprising:
   linking write-address information with data in the source clock domain;
   generating a transmit clock signal in the source clock domain, the transmit clock signal being synchronous with the source clock;
   transmitting the data with the linked write-address information and the transmit clock signal to the receive clock domain;
   writing the data at an address designating a storage element, the address corresponding to the linked write-address information, the storage element being located in the receive clock domain and the data being clocked into the storage element synchronous with the transmit clock signal; and
   reading the data from the storage element synchronized with the receive clock;
   wherein the data is N bits wide and the storage element is M locations deep, and the data with the linked write-address information is communicated using at most $N+2*\lceil \log_2(M) \rceil+4$ electrical signal paths, M being a power of 2.

2. A method of passing data from a source clock domain to a receive clock domain, the source and receive clock domains respectively using non-synchronous source and receive clocks, the method comprising:
   linking write-address information with data in the source clock domain;
   generating a transmit clock signal in the source clock domain, the transmit clock signal being synchronous with the source clock;
   transmitting the data with the linked write-address information and the transmit clock signal to the receive clock domain;
   writing the data at an address designating a storage element, the address corresponding to the linked write-address information, the storage element being located in the receive clock domain and the data being clocked into the storage element synchronous with the transmit clock signal; and
   reading the data from the storage element synchronized with the receive clock;
   wherein the data is N bits wide and the storage element is M locations deep, and the data with the linked write-address information is communicated using at most $N+3*\lceil \log_2(M) \rceil+4$ electrical signal paths, M not being a power of 2.

3. A circuit arrangement for passing data from a source clock domain to a receive clock domain, the source and receive clock domains respectively using non-synchronous source and receive clocks, the circuit arangememt comprising:
   means for linking write-address information with data in the source clock domain;
   means for generating a transmit clock signal in the source clock domain, the transmit clock signal being synchronous with the source clock;
   means for transmitting the data with the linked write-address information and the transmit clock signal to the receive clock domain;
   means for writing the data at an address designating a storage element, the address corresponding to the linked write-address information, the storage element being located in the receive clock domain and the data being clocked into the storage element synchronous with the transmit clock signal;
   means for reading the data from the storage element synchronized with the receive clock; and
   at most $N+P*\lceil \log_2(M) \rceil+4$ electrical signal paths coupled between the source and receive clock domains for communicating the data with the linked write-address information, wherein the data is N bits wide, the storage element is M locations deep, and P is 2 when M is a power of 2 and is 3 when M is not a power of 2.

4. A circuit arrangement for passing data from a source clock domain to a receive clock domain, the source and receive clock domains respectively using non-synchronous source and receive clocks, the circuit arrangement comprising:
   means for linking write-address information with data in the source clock domaim;
   means for generating a transmit clock signal in the source clock domain, the transmit clock signal being synchronous with the source clock;
   means for transmitting the data with the linked write-address information and the transmit clock signal to the receive clock domain;
   means for writing the data at an address designating a storage element, the designated address corresponding to the linked write-address information, the storage element being located in the receive clock domain and the data being clocked into the storage element synchronous with the transmit clock signal;
   means for reading the data from the storage element synchronized with the receive clock; and
   at most $N+P*\lceil \log_2(M) \rceil+4$ electrical signal paths coupled between the source and receive clock domains for communicating the data with the linked write-address information, wherein the data is N bits wide, the storage element is M locations deep, and P is 2 when M is a power of two and is 3 when M is not a power of two; and means for disabling the transmit clock signal during periods when the means for transmitting is not transmitting the data with the linked write-address information.

5. A circuit arrangement for passing data from a source clock domain to a receive clock domain, the source and receive clock domains respectively using non-synchronous source and receive clocks, the circuit arrangement comprising:
   a first clock generator adapted to generate a transmit clock signal in the source clock domain, the transmit clock signal being synchronous with the source clock;
   a first processing circuit adapted to link write-address information with data in the source clock domain and to transmit the data with the linked write-address information and the transmit clock signal to the receive clock domain;

a second processing circuit in the receive clock domain adapted to write the data at an address designating a storage element, the address corresponding to the linked write-address information, the storage element being located in the receive clock domain and the data being clocked into the storage element synchronous with the transmit clock signal;

the second processing circuit being further adapted to read the data from the storage element synchronized with the receive clock; and at most $N+2*\lceil \log_2(M) \rceil +4$ electrical signal paths coupled between the first and second processing circuits for communicating the data with the linked write-address information, wherein the data is N bits wide, the storage element is M locations deep, and M is a power of 2.

6. A circuit arrangement for passing data from a source clock domain to a receive clock domain, the source and receive clock domains respectively using non-synchronous source and receive clocks, the circuit arrangement comprising:

a first clock generator adapted to generate a transmit clock signal in the source clock domain, the transmit clock signal being synchronous with the source clock;

a first processing circuit adapted to link write-address information with data in the source clock domain and to transmit the data with the linked write-address information and the transmit clock signal to the receive clock domain;

a second processing circuit in the receive clock domain adapted to write the data at an address designating a storage element, the address corresponding to the linked write-address information, the storage element being located in the receive clock domain and the data being clocked into the storage element synchronous with the transmit clock signal;

the second processing circuit being further adapted to read the data from the storage element synchronized with the receive clock; and at most $N+3*\lceil \log_2(M) \rceil +4$ electrical signal paths coupled between the first and second processing circuits for communicating the data with the linked write-address information, wherein the data is N bits wide, the storage element is M locations deep, and M is not a power of 2.

7. A circuit arrangement for passing data from a source clock domain to a receive clock domain, the source and receive clock domains respectively using non-synchronous source and receive clocks, the circuit arrangement comprising:

a first clock generator adapted to generate a transmit clock signal in the source clock domain, the transmit clock signal being synchronous with the source clock;

a first processing circuit adapted to link write-address information with data in the source clock domain and to transmit the data with the linked write-address information and the transmit clock signal to the receive clock domain;

a second processing circuit in the receive clock domain adapted to write the data at an address designating a storage element, the address corresponding to the linked write-address information, the storage element being located in the receive clock domain and the data being clocked into the storage element synchronous with the transmit clock signal;

the second processing circuit being further adapted to read the data from the storage element synchronized with the receive clock; and at most $N+p*\lceil \log_2(M) \rceil +4$ electrical signal paths coupled between the first and second processing circuits for communicating the data with the linked write-address information, wherein the data is N bits wide, the storage element is M locations deep, and P is 2 when the storage element has a depth that is a power of two and is 3 when the storage element has a depth that is not a power of two; and a circuit adapted to disable the transmit clock signal during periods when the first processing circuit is not transmitting the data with the linked write-address information.

* * * * *